United States Patent [19]

Baumgartner

[11] 4,363,347
[45] Dec. 14, 1982

[54] MOTOR VEHICLE WHEEL

[75] Inventor: Heinrich Baumgartner, Schenkenzell, Fed. Rep. of Germany

[73] Assignee: BBS-Kraftfahrzeugtechnik GmbH, Schiltach, Fed. Rep. of Germany

[21] Appl. No.: 89,770

[22] Filed: Oct. 31, 1979

[51] Int. Cl.³ .............................................. B60B 21/02
[52] U.S. Cl. .................................. 152/411; 152/412; 29/159.1
[58] Field of Search .................... 301/10 R, 10 C, 15, 301/23, 35 R, 63 R, 63 D, 64 R, 95, 96, 99, 101; 152/396–398, 402, 405–408, 411–413; 29/159.1, 159.01

[56] References Cited

U.S. PATENT DOCUMENTS

| 58,447 | 10/1866 | Mellon | 301/10 R |
| 1,173,491 | 2/1916 | Downing | 152/60 |
| 3,611,535 | 10/1971 | Nobach | 29/159.01 |
| 3,612,614 | 10/1971 | Ware | 301/63 R |

FOREIGN PATENT DOCUMENTS

| 817083 | 10/1951 | Fed. Rep. of Germany | 152/413 |
| 6733 | of 1897 | United Kingdom | 152/412 |
| 640 | of 1907 | United Kingdom | 152/412 |
| 195894 | 4/1923 | United Kingdom | 29/159.1 |

Primary Examiner—H. Grant Skaggs
Attorney, Agent, or Firm—Robert B. Frailey

[57] ABSTRACT

A motor vehicle wheel comprising two mating, annular, permanently connected parts formed without cutting and composed of different, but congenerically similar, materials. The wheel is composed of an inner wheel part, which comprises the inner and greater part of the rim bed together with the wheel disc, and an outer wheel part which forms the remaining and smaller part of the rim bed. The two parts are connected together at their respective rim bed portions to provide a complete rim bed. The two wheel parts are provided with mating, generally annular, contiguous connection surfaces which may be of cylindrical, conical and/or serrated configuration and which are joined in an air-tight manner.

8 Claims, 4 Drawing Figures

MOTOR VEHICLE WHEEL

BACKGROUND OF THE INVENTION

The invention concerns a motor vehicle wheel which consists of two parts permanently connected to each other, the parts being formed without cutting and consisting of different materials. Motor vehicle wheels of this type have an inner annular part which comprises the major portion of the rim bed together with the wheel disc, which may be made in spoke form, and an outer annular part which forms the remaining, smaller part of the rim bed. In such kown motor vehicle wheels, there are many variations in construction, materials used and manufacturing processes employed, by which these three characteristics are determined more or less naturally in relation to each other, although certain cross-combinations also are possible. The motor vehicle wheel parts generally are made out of the same material, either by casting or from sheet metal such as, for example, sheet steel or metal alloy sheet, in which unfinished discs or tubes of sheet metal are shaped into the final desired form by presses or mills.

At the basis of this invention is the fact that is known in itself, but which up to the present has not had its optimal exploitation, that the forces which are transmitted from the vehicle tires through the wheel rim bed and the wheel disc or spokes to the wheel hub are operative principally from the inner bed of the rim inward to the hub, while the axial and radial forces that take place, for example during travel about a curve, work pricipally on the inner rim bed. From this there derives an incentive to transmit those forces over a single part, without interruption of the force flow through connection points, to the hub. Up to now, this objective has not yet been realized in an appropriate form.

SUMMARY OF THE INVENTION

The object of the invention is the optimal exploitation of this known, but never fully developed principle in the construction of and the material selection for a motor vehicle wheel. In the solution of this task, there must also be considered and solved the problems that derive from the creation of a solid, permanent and possibly also sealed connection (taking into consideration tubeless tires) between the two annular wheel parts, which connection must not only transmit during use the outside axial and radial forces which develop, but also transmit the increased torsion forces which develop within the wheel during acceleration and braking of the vehicle.

In accordance with the invention, the basic idea for the solution of this task is that both annular wheel parts consist of a similar type of light metal alloy, i.e. are constituted of different, but congenerically similar, light metal alloys, with the inner part made of a light metal alloy with a higher tensile strength or rigidity and lower elasticity or resilience than the light metal alloy used for the outer part. The two light metal alloys are congeners, i.e. are specifically different alloys, but generically related chemically. The two light metal alloys are congeners, i.e. are specifically different alloys having differing physical properties, but are composed of the same base metal, such as Al Mg Si 1 and Al 99.9 Mg 1, for example. The inner part and the outer part are connected to each other in an air-tight manner, without soldering or welding, along continuous connection surfaces composed of a generally annular outer surface formed on the inner part and a mating or complementary generally annular inner surface formed on the outer part, the connection surfaces between the parts being contiguous at all points. By means of the foregoing construction, the creation of an undesirable electrolytic effect between the wheel parts is avoided. The formation of an electrolytic effect is likely to impair or destroy the contiguous, air-tight connection between those two parts. If the two annular wheel parts are composed of dissimilar metal alloys, the penetration of water in the area of their connection could create an electrolytic effect. Similarly, if the two wheel parts are joined by welding or soldering, an undesirable electrolytic effect also could occur. As will be understood, if the air-tightness of the connection between the two annular wheel parts is destroyed, the wheel is useless with tubeless tires.

The circumstances require in a motor vehicle wheel the use of a material with relatively high strength, but with relatively low resilience for the inner part of the rim bed and for the areas of the wheel that transmit the forces to the hub. The outer bed of the rim normally is subjected to less axial and radial forces, so that a material with less rigidity, but a higher elasticity, can be used. Shock forces, occurring for example through collision with road obstacles, can be absorbed through the relative high elastic parts. Sudden air loss, due to tearing off or rupturing of the outer rim bed for some reason, is substantially eliminated.

A motor vehicle wheel made according to this invention incorporates the advantages of a two piece construction and retains the advantages of a single piece cast wheel, but avoids the disadvantages associated with the single piece construction.

The connection of the two wheel parts is made—and this also is an essential characteristic of the invention—in such a manner in that the inner part and the outer part preferably are permanently connected to each other through a generally cylindrical outer surface on the inner part and a mating, generally cylindrical inner surface on the outer part. The securing of the connection surfaces between the inner part and the outer part in accordance with the invention can take place by means of an adhesive appropriate to this type of connection. The adhesive connection further provides air tightness at the connection points which, when using tubeless tires, is of course necessary.

The actual connection between the outer wheel part and the inner wheel part may occur in various ways. The outer part can be shrunk onto the inner part. This requires either a heating of the outer part and/or a deep cooling of the inner part. This connection can be reinforced and a separation of the parts under normal conditions further guarded against by providing connection surfaces between the parts which comprise inwardly extending, smoothly tapering conical surfaces. An even more secure connection between the two parts may be obtained by providing complemental serrations on each of the mating connection surfaces between the inner wheel part and the outer wheel part. Further, in accordance with the invention, the complemental connection surfaces may be provided with mating threads disposed concentrically to the axis of the wheel. Of course, the connection between the two wheels parts also can be made by means of screws or bolts. In all such possibilities for the connection of the two wheel parts, an adhesive may be applied to the mating, annular connection surfaces.

DESCRIPTION OF THE VIEWS OF THE DRAWING

In the drawing, there is shown one preferred embodiment of the entire wheel, while for the connection between the annular wheel parts variations are shown.

DETAILED DESCRIPTION OF THE INVENTION

Figure 1:
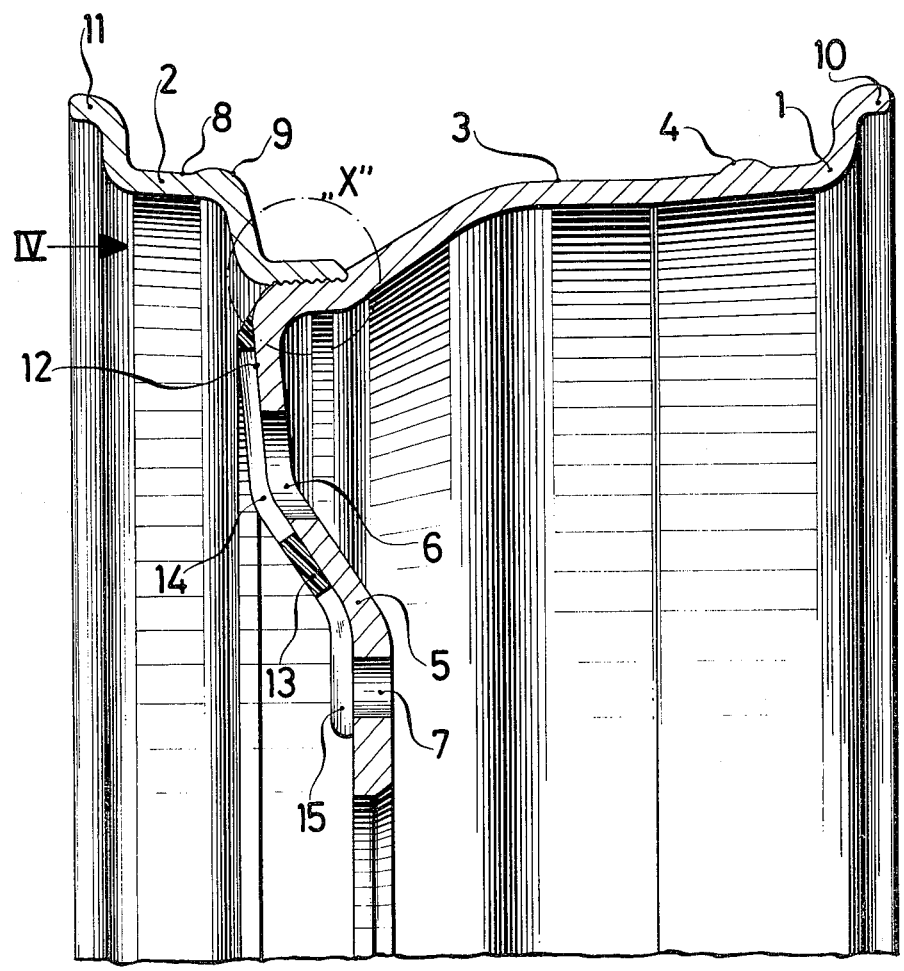
FIG. 1 shows a half axial section through a two-part motor vehicle wheel in accordance with the invention.

Referring to FIG. 1, the motor vehicle wheel consists of two annular parts 1 and 2. The inner wheel part 1 (on the right side of FIG. 1) comprises the greater part of the rim bed, i.e. the inner rim bed 3 having a hump 4, as well as the wheel disc 5 provided with the openings 6 for brake ventilation and the passages 7 for the wheel mounting screws (not shown). The wheel disc 5, in contrast to the drawing, may also have the form of spokes. The outer wheel part 2 provides the remaining and smaller part of the rim bed, i.e. the outer rim bed 8 with a hump 9. The wheel flanges are designated 10 and 11, respectively.

Sprayed on or adhered to the outer front side 12 of the wheel disc 5 of the inner wheel part 1 is an optical working covering 13, composed for example of synthetic material or metal, and having apertures 14 for the brake cooling openings 6 and apertures 15 for the passages 7 for the wheel mounting screws.

Figure 2:
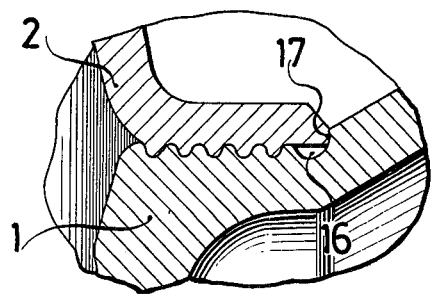
FIGS. 2 and 3 show in enlarged fragmentary section two different arrangements for the connection between the wheel parts, within the area indicated by the dotted circle X in FIG. 1.

Between the inner wheel part 1 and the outer wheel part 2, in the annular area X, concentric to the axis of the wheel, there are provided cut or preferably rolled threads, preferably rolled round threads. This is shown on a larger scale in FIG. 2. The thread on the outer surface of the inner wheel part 1 has a back cut 16 which serves to facilitate the manufacture of the thread (as collector for thread cutting metal). In this thread connection there may be provided an appropriate adhesive for securing the threads and at the same time for obtaining an air-tight sealing. The extent of threading engagement, and hence the final relative position between the wheel parts 1 and 2 as well as the width of the finished wheel, is determined by the contiguous stop surfaces 17 formed both on the inner part 1 and the outer part 2.

Figure 3:
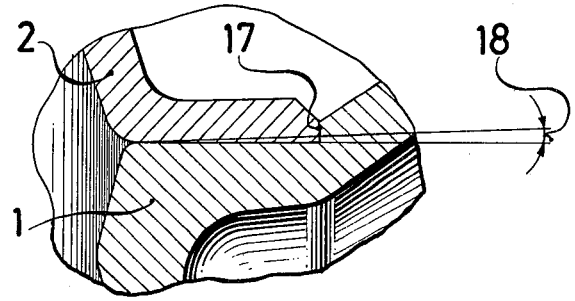

The outer wheel part 2 also can be shrunk while heated onto the inner wheel part 1. In this arrangement, the annular surfaces that come into contact with each other on parts 1 and 2 may be completely cylindrical. But as shown in FIG. 3, the surfaces also may extend inward (inside the wheel) as smooth, tapering conical angles 18. With both the cylindrical as well as the conical shrinkage surfaces, the use of an adhesive between the mating or contiguous surfaces is possible.

Figure 4:
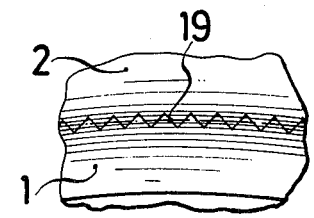
FIG. 4 shows another arrangement of the connection between the wheel parts, viewed in the direction of the arrow IV in FIG. 1.

In addition, there may be provided between the inner wheel part 1 and the outer wheel part 2 a serrated connection 19 as shown in FIG. 4. This can be particularly advantageous with regard to the high torsion forces that occur during use. In connection with such a serration 19, shrinking on, conical run on (as in FIG. 3) and the application of an adhesive between the mating surfaces of the inner part 1 and the outer part 2 that come into contact with each other may be provided. In the arrangements according to FIG. 3 or FIG. 4, there are provided end surfaces 17 on both parts 1 and 2 which determine the final assembled location of those parts and the width of the finished wheel.

Wheel parts 1 and 2 may be manufactured from round (rolled material or cast warm pressed blanks) or from hollow cylinders, as well as from tubular parts. For both parts, there may be used similar light metal alloys of high durability, in comparison with cast alloys, and which prevent the creation of any electrolytic effect between the wheel parts, such as aluminum or magnesium molded alloys (for example: Al Mg Si, or Al Cu Mg, or Al Zn Mg (Cu), or AZ-855, or Al 99.9 Mg, or Al Mg), although, as has been stated previously for the inner part 1 and the outer part 2 distinct, but congenerically similar, materials preferably are used. For example, for the inner wheel part, tempered alloys such as Al Mg Si 1 may be used; for the outer wheel part, shiney materials such as Al 99.9 Mg 1, may be used. Such alloys are "congeners" in that they incorporate the same base metal, differing only in their alloying elements and their specific physical properties. Thus, they have the inherent advantage of avoiding the creation of an undesirable electrolytic effect between the two wheel parts in the event, for example, water should penetrate in the area of their connection. In the inventive construction, the greatest possible connecting surface between the inner and the outer wheel parts is ensured, without unnecessarily weakening the cross-section of either of the two parts in those areas. The inner part may be formed by a rolling process (pressing) so that it has a satisfactory stability. A continuous cross-sectional variation from the flanges 10, 11 of the rim bed 3, 8 to the hub is possible, with both partial cross-sectional enlargements as well as partial cross-sectional reductions, which contribute to the required stability at each of the respective desired locations so that, for example, reinforcement ribs, generally used in these cases, are not necessary.

A motor vehicle wheel in accordance with the invention may be assembled by means of wheel bolts and flat collar nuts; however angularly located steel bushings also may be pressed in to join the wheel components. The center bore of the wheel disc 5, by means of which the wheel parts preferably are aligned when assembled using the wheel bolts and flat collar nuts, may be counter-sunk to facilitate fitting the parts together. The mounting holes and the central aperture in the wheel preferably are formed after the outer and inner wheel parts have been finally assembled, in order that the necessary tolerances may be more easily obtained.

The front side contact surfaces on the inner part and on the outer part ensure the length dimensions of the finished wheel, such as its axial width. The principal advantages of a wheel according to the invention are the basic advantages of the multiple piece construction while retaining the advantages of the single piece cast wheel and avoiding the disadvantages associated with the latter. A lower material consumption is called for. Alloys with higher durability may be used. Intermediate annealing processes with undesired structural changes of the material are not required. Only relatively low machine expenditures for production are necessary. Nevertheless, the construction is generally appropriate manufacturing on a mass production basis. The finished parts are of extremely low weight and, because of reduced material usage, a cost advantage is produced. Through the reduction in weight, technical driving advantages are produced, such as reduced undercarriage masses, etc. There is a great flexibility with regard to possible dimensions, above all rim width. Processing expenditures are low as, for example, the pressing procedure produces nearly all of the required precision of the finished piece. The individual parts can be manufactured through roller presses or deep drawing.

Since in both parts of the wheel no castings are used, expensive tests are not necessary as, for example, with castings which require a 100% X-ray testing. This, of course, substantially influences the manufacturing time and the manufacturing cost of the wheel.

In the claims, the term "different, but congenerically similar" shall indicate alloys composed of the same base or dominant metal, such as aluminum or magnesium, but which incorporate specifically different alloying elements to provide the alloys with specifically different physical properties, such as variations in tensile strength and expansibility.

I claim:

1. A motor vehicle wheel having a wheel disc and a rim bed for mounting a tire, said wheel consisting of two permanently connected, preformed parts composed of distinct materials, one wheel part comprising a single integral inner part forming both the wheel disc and the inner and larger portion of the rim bed and the other wheel part comprising an outer part forming the remaining and smaller portion of the rim bed, said two wheel parts being connected together along their respective rim bed portions to provide a complete rim bed, wherein
   (a) said inner wheel and outer wheel parts are connected together in an air-tight manner, without soldering or welding, by contiguous and continuous connection surfaces comprising a generally annular connection surface formed on one wheel part and a complemental generally annular connection surface formed on the other wheel part;
   (b) the two wheel parts consist of similar light metal alloys constituted of the same base metal but of different alloying elements, whereby the creation of a corrosion inducing electrolytic effect between the inner and outer wheel parts, which would impair the integrity of the air-tight connection between said two parts, is prevented;
   (c) the light metal alloy of the inner wheel part has a relatively higher tensile strength and a relatively lower resilience than the light metal alloy of the outer wheel part to enable said inner wheel part to transmit forces from the tire inwardly through the rim bed and the wheel disc to the hub of the wheel without interruption; and
   (d) the light metal alloy of the outer wheel part has a relatively lower tensile strength and a relatively higher resilience than the light metal alloy of the inner wheel part to enable said outer wheel part to absorb shock forces occurring when the wheel is in use.

2. A motor vehicle wheel in accordance with claim 1 having an adhesive interposed between the connection surfaces of said two wheel parts.

3. A motor vehicle wheel in accordance with either claim 1 or claim 2, characterized in that the outer wheel part is shrunk on the inner wheel part along the connection surfaces.

4. A motor vehicle wheel in accordance with either claim 1 or claim 2, characterized in that the connection surfaces between the two wheel parts comprise inwardly extending, smoothly tapering conical surfaces.

5. A motor vehicle wheel in accordance with either claim 1 or claim 2, characterized in that the connection surfaces between the two wheel parts include serrations.

6. A motor vehicle wheel in accordance with either claim 1 or claim 2, characterized in that the connection surfaces between the two wheel parts include complemental threads disposed concentrically to the axis of the wheel.

7. A motor vehicle wheel in accordance with either claim 1 or claim 2, characterized in that the connection surfaces between the two wheel parts comprise inwardly tapering conical surfaces provided with mating serrations.

8. A motor vehicle wheel in accordance with either claim 1 or claim 2, characterized in that the connection surfaces between the two wheel parts comprise inwardly extending, smoothly tapering conical surfaces, and the outer wheel part is shrunk onto the inner wheel part along the complemental conical connection surfaces.

* * * * *

UNITED STATES PATENT AND TRADEMARK OFFICE
CERTIFICATE OF CORRECTION

PATENT NO. : 4,363,347

DATED : December 14, 1982

INVENTOR(S) : Heimrich Baumgartner

It is certified that error appears in the above-identified patent and that said Letters Patent are hereby corrected as shown below:

Delete the text in column 5, lines 16-22, and substitute the following in lieu thereof:

--The term "alloy" is used herein to indicate a homogeneous mixture of a dominant base metal and relatively small quantities of one or more alloying elements to impart improved physical properties to the base metal. The light metal alloys utilized in this invention not only enable the use of wheel parts having differing degrees of tensile strength and resilience, but because of their inherent or congeneric similarity — due to their dominant base metals being identical — they also prevent the creation of a corrosion inducing electrolytic effect between the two wheel parts in the presence of water or similar electrolytes. Such electrolytic effect may impair the air-tight annular connection between the contiguous mating surfaces of the inner and outer wheel parts of the motor vehicle wheel of this invention.--

Signed and Sealed this

Eighth Day of March 1983

[SEAL]

Attest:

Attesting Officer

GERALD J. MOSSINGHOFF

Commissioner of Patents and Trademarks